Figure 1:
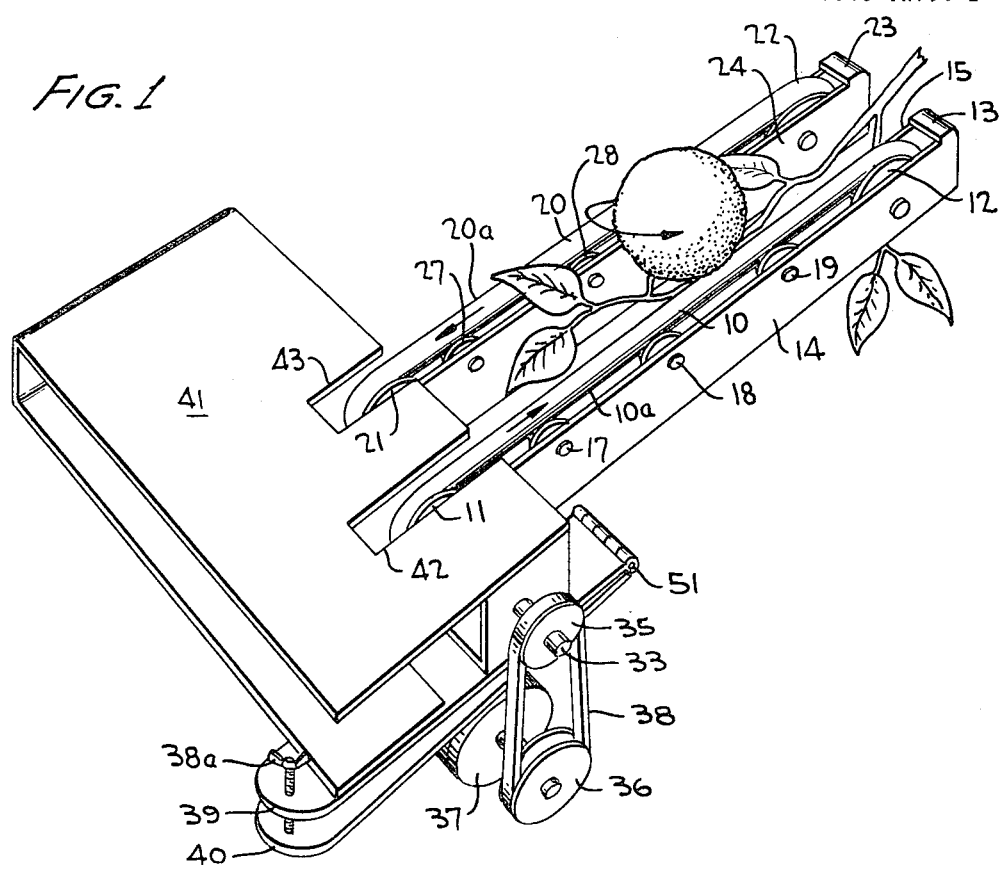

Nov. 26, 1968    E. L. KENTON    3,412,542
PICKING HEAD FOR FRUIT HARVESTER

Filed May 26, 1966    2 Sheets-Sheet 1

INVENTOR,
E. L. KENTON

Nov. 26, 1968  E. L. KENTON  3,412,542
PICKING HEAD FOR FRUIT HARVESTER
Filed May 26, 1966  2 Sheets-Sheet 2
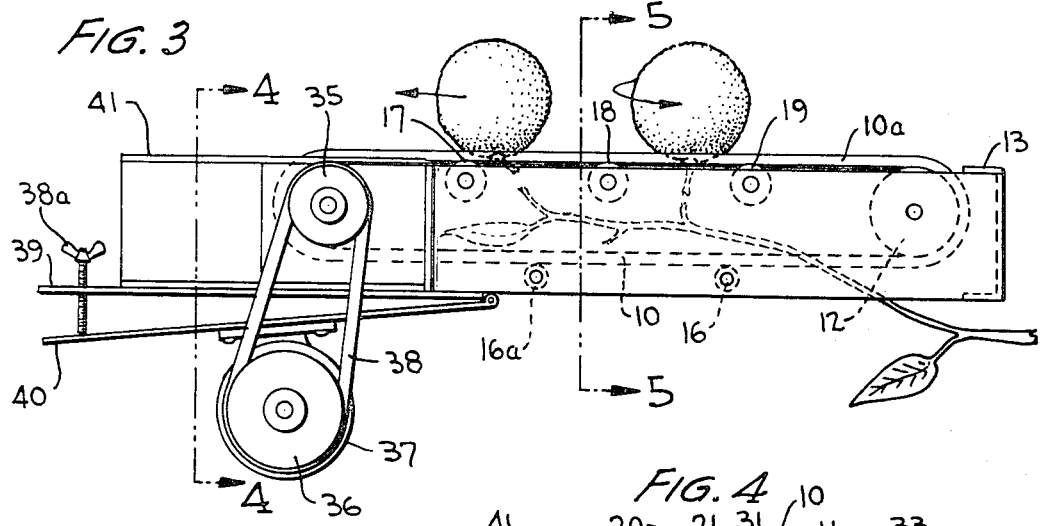
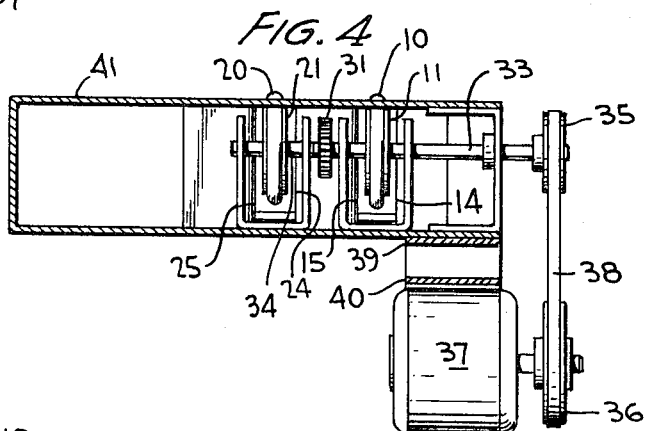
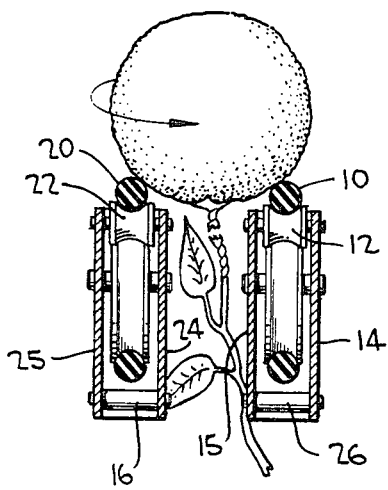
INVENTOR,
E. L. KENTON

United States Patent Office 3,412,542
Patented Nov. 26, 1968

3,412,542
PICKING HEAD FOR FRUIT HARVESTER
Ernest L. Kenton, Kissimmee, Fla., assignor to Kid Glove Harvesters, Inc., Orlando, Fla., a corporation of Florida
Filed May 26, 1966, Ser. No. 553,062
13 Claims. (Cl. 56—328)

This invention relates to mechanized fruit harvesting equipment and more specifically to the picking heads for such equipment.

A number of different types of mechanical fruit pickers have recently been disclosed. These devices generally provide one or more mobile booms or arms capable of being moved among the branches of fruit trees. Associated with each such boom or arm is one or more picking heads which function to dislodge the fruit from the tree and to direct the fruit to a fruit conveying system into a fruit storage device associated with the harvester with minimum bruising and damage.

Various fruit picking head devices have been suggested. Bergquist, in U.S. Patent 3,161,007 discloses a mechanism (FIGURE 2) wherein a pair of wide resiliently surface belts envelop the fruit hanging from the tree and pull it from the tree branch. The considerable compressive force which must be applied to the fruit by this device can result in bruising or other damage to the product. Also, the force with which the fruit must be pulled to break the stem by purely tension can be damaging to the fruit trees. In another embodiment of the device disclosed in the Bergquist patent (FIGURE 1), the fruit is rotated about an axis transverse to its stem by means of a single wide resiliently-surfaced belt co-operating with an opposed, parallel smooth stationary surface. This device in effect rips the fruit from the tree, the stem again being broken by a force which is essentially tensile in nature, with no torsional component.

Polk, in U.S. Patent 3,143,844, discloses a device in which the fruit is severed from the tree by twisting it about its stem. Thus, the embodiment depicted in FIGURE 8 comprises a number of spring-loaded fingers with idler rollers at their respective tips which engage the fruit and push the opposite surfaces thereof against a rotating belt which causes the fruit to rotate about its stem. Aside from the fact that the disclosed mechanism is exceedingly cumbersome, the squeezing of the fruit between the fingers and the rotating means is an essential concomitant to its operation. Thus fruit can be bruised if the spring tension on the fingers is too great. Also if the fingers fail to retract properly, gouging of the fruit will result.

In general, although the devices so far disclosed do serve to dislodge fruit from the trees, as yet there is none which operates with sufficient gentleness consistently to preserve the quality of the fruit while avoiding damage to the trees. Nor is any reliable enough in operation to assure that a single pass by the device over a given tree branch will remove essentially all of the ripe fruit from it.

I have now discovered that sufficient turning moment can be imparted to fruit hanging from a tree branch to shatter the stem by twisting the fruit about an axis running through the stem, by merely contacting the fruit on either side of that axis by a pair of resilient surfaces each moving linearly in a direction opposite to that of the other. In this manner of severing the stem it is necessary neither to grip the fruit in such a manner as to risk bruising it nor to exert tensile forces on the fruit which may damage the branch or the fruit, or both.

It is therefore an object of this invention to provide a picking head for a mechanical fruit picker which will remove ripe fruit from a tree without bruising or otherwise damaging the fruit and also without damaging the tree.

Figure 2:
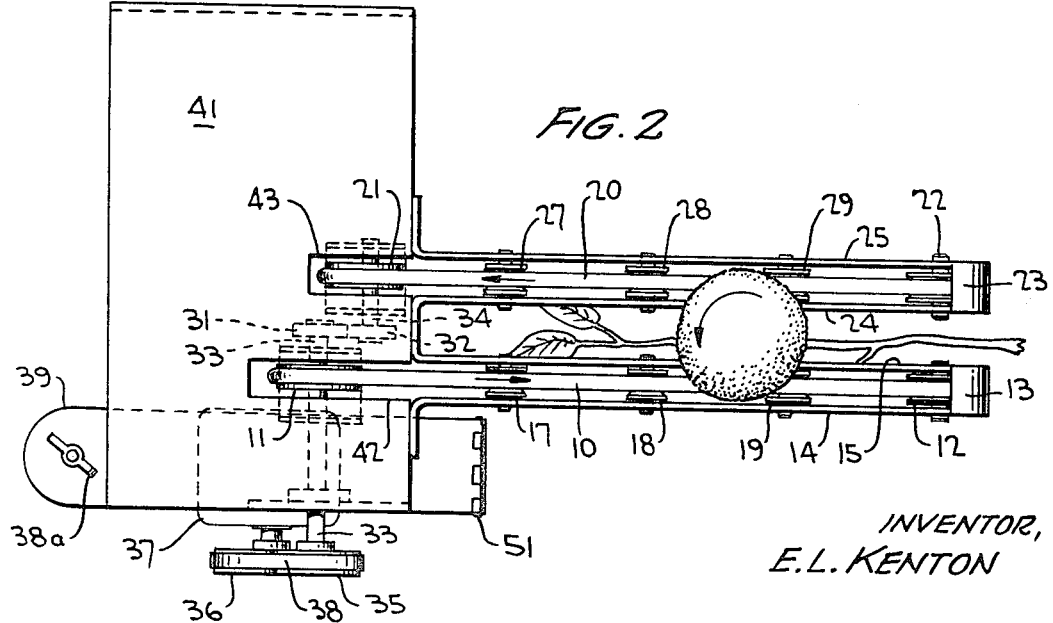

The manner in which the instant invention accomplishes these and other objectives will become apparent from this specification, especially when considered in conjunction with the accompanying drawings in which:

FIGURE 1 is a perspective drawing of a fruit picking head representing an embodiment of this invention;
FIGURE 2 is a plan view of the same picking head;
FIGURE 3 is a side elevation of the same picking head;
FIGURE 4 is a cross-sectional view of this picking head at plane 4—4; and
FIGURE 5 is a cross-sectional view of the same picking head viewed at plane 5—5.

A pair of resiliently-surfaced fruit engaging means is provided which are adapted to contact the fruit on either side of the stem by which the fruit is attached to the branch. It is the function of the fruit engaging means to make contact with the surface of the fruit on either side of the stem by which the fruit hangs from the tree limb and to impart a twisting motion or torque to the fruit which will serve to shatter that stem and thereby dislodge the fruit from the tree. Thus, each of the fruit engaging means must be capable of motion at least a portion of which describes a line segment so that the two line segments of the pair of fruit engaging means are parallel to, spaced apart from, and opposed to each other. The direction of motion in one engaging means will be opposite to that in the other. The space between the fruit engaging means must be unobstructed to permit these means to be passed upwardly on either side of a fruit-bearing tree branch and thereby apply the said torque to the fruit at the desired location.

Referring now especially to FIGURES 1–3, the embodiment of the invention depicted in the drawings has a pair of endless belts 10 and 20, respectively, as the fruit contacting means. Belt 10 is rotatably mounted between driven pulley 11 and idler pulley 12. The belt 10 rotates in belt housing 13, which is comprised of walls 14 and 15 spaced apart by spacers 16 and 16a to provide space therebetween for pulleys 11 and 12 as well as for the belt. Optionally, a number of idler pulleys 17, 18 and 19 may be provided to prevent that portion of the belt which will contact the fruit from being deflected from its planar configuration. It will be noted that that portion 10a of belt 10 which is to make contact with the fruit is not surrounded by the belt housing but rather is exposed above the top of it.

Analogously, belt 20 rotates between pulleys 21 and 22 in belt housing 23 which consists of housing walls 24 and 25 maintained at the correct spacing by spacers 26 and 26a. Again, idler pulleys 27, 28 and 29 may be provided to maintain the fruit-contacting portion of belt 20 in a planar configuration.

The belts 10 and 20 need be of no particular width, and can in fact be quite narrow, inasmuch as they merely make line contact with the fruit. They may be of circular cross-section as indicated in FIGURE 5, or the familiar "V-belts," or belts of any other conventient cross-section may be used. The rubberized fabric constructions generally employed for such belts will provide a sufficiently resilient surface for fruit-contacting purposes.

Of the main pulleys for each of these belts, the pulleys 12 and 22 nearest the unsupported end of the belt housings are idler pulleys whereas the pulleys 11 and 21 nearest the supported end are driven in such fashion as to counter-rotate the belts, i.e. to rotate each belt in a direction opposite to that of the other. Any convenient driving arrangement may be used. The one illustrated in the figures involves a pair of spur gears 31 and 32 attached respectively to shafts 33 and 34, respectively, of pulleys 11 and 21. Shaft 33 is an extended shaft on which is also mounted a driver pulley 35 which with variable diameter pulley 36 and belt 38 constitutes a variable speed drive unit which transmits torque from a prime mover 37 to shaft 33. The prime mover may be an electric motor, an internal combustion motor or any other source of torque. Alternatively, there may be provided a connection to a more centralized source of torque by such means as a flexible shaft. In this fashion several such picking heads may be powered by the same prime mover. In the embodiment shown, the variable speed drive is adjusted by turning wing bolt 38a which adjusts the distance between mounting plates 39 and 40 (which are attached to each other at hinge 51). This adjustment varies the distance between pulleys 35 and 36 and thereby varies the effective diameter of variable diameter pulley 36 and thus the speed of belt 38.

The surfaces of those portions of belts 10 and 20 which are exposed from their respective belt housings 13 and 23, namely portions 10a and 20a respectively, define a plane. Adjacent the supported extremity of the belt housing is fruit conveying surface 41 which is disposed substantially co-planar with the said plane defined by portions 10a and 20a of the said belts. In the embodiment shown, all of the driving means for the said belts are disposed below this fruit conveying surface, the surface being broken by slots 42 and 43 in order to accommodate drive pulleys 11 and 21 respectively.

The region between belt housings 13 and 23, or more specifically the region defined between belt housing walls 15 and 24, is substantially unobstructed in order to permit passage therebetween of the tree branch from which the fruit is to be picked. Similarly the region beyond the outboard end of belt housings 13 and 23, i.e. the region beyond pulleys 12 and 22 is substantially unobstructed.

It is important that the spacing between the belts, and therefore between the belt housings be the proper one. Obviously, the belts must be sufficiently far apart to permit the tree branch to pass therebetween. However, they should not be separated from each other by as much as the diameter of the fruit to be picked, so that the belts will impart their twisting moment to the surface of the fruit on either side of the axis containing the stem.

Thus it is seen that the fruit picking head of the instant invention is substantially a U-shaped device with resiliently surfaced linearly counter-moving picking means defining the legs of the U, a fruit conveying surface substantially co-planar therewith defining the base of the U, motive means for the picking means conveniently located beneath the fruit conveying surface and the region between the legs of the U and beyond the termini of those legs remaining substantially unobstructed.

In operation one or more of the picking heads of this invention are attached to one or more booms or arms of a picking machine and are moved with a gently combing motion upwardly through the branches of the fruit tree. Fruit bearing branches will pass between the parallel belts of a given picking head and turn in such fashion that the fruit will be lifted above the branch, the branch slipping between the parallel belt housings. The counter-motion of the belts imparts a torque about the stem of each piece of fruit causing it to twist about that stem unitl the stem shatters. The fruit, now separated from the tree, spins along the belts which are gently inclined to slope downward toward the fruit conveying surface until the fruit has rolled off the belts and on to the fruit conveying surface. Thence the fruit rolls either into a fruit collecting basket attached in a conventional fashion (not shown) to the fruit conveying surface or by conventional fruit conveying means to a centralized fruit collecting device located on the ground.

Obviously, this invention is applicable to the harvesting of many varieties of fruit. Not only citrus fruit, i.e. lemons, oranges and grapefruit may be harvested thereby, but also such other fruit as apples, pears and the like. The spacing between the parallel belt housings may have to be varied for picking heads designed to pick various fruit. Thus, a greater spacing may be desirable for a picking head designed to pick grapefruit than for one designed to pick lemons. It will also be apparent to those with ordinary skill in the art how the spacing between belt housings may be made adjustable.

It will also be apparent to those with ordinary skill in the art that resiliently surfaced means other than endless belts can be used in this invention to impart the proper twisting moment to the fruit, without departing from the spirit or scope of this invention.

Having thus described my invention what I claim and desire to protect by Letters Patent is:

1. A picking head for a fruit harvester mechanism comprising a pair of resiliently surfaced endless belts; a belt housing for each of said belts containing a pulley rotatably mounted adjacent each extremity thereof to permit rotation of one of said belts therebetween, each of said belt housings being adapted to expose a planar portion of the surface of the belt rotating therein, and each of said belt housings being mounted parallel to the other at a point adjacent to one of its extremities so that the adjacent surfaces of the said belt housings define an unobstructed space between them, the distance between said belts being less than the diameter of the fruit to be picked; motive means to rotate the pulleys nearest the supported end of each of the belt housings in such fashion that the respective belts will rotate each in a direction opposite to that of the other; and a fruit conveying surface co-planar with the exposed surfaces of the said belts and connecting the supported ends of the said belt housings.

2. A picking head for a fruit harvester comprising a pair of belt housings each containing near each of its two extremities a rotatably mounted pulley, a pair of resiliently surfaced belts each rotatably mounted on the pulleys of one belt housing, each belt housing being adapted to expose the surface of the said belt in one of its traverses of the path between pulleys, each of said belt housings being supported near one of its extremities, the pulley adjacent to the unsupported extremity of each belt housing being an idler pulley, the pulley adjacent to the supported end of each housing being driven to rotate in a direction opposite to that of the other, said housings being substantially parallelly mounted at a distance from each other less than the diameter of the fruit to be picked to define between them an unobstructed space, a substantially flat surface extending beyond the supported extremity of said housings, said surface being substantially co-planar with the plane defined by the exposed portion of said belts, and motive means disposed beneath said surface for rotating said driven pulleys.

3. In a fruit harvester, a U-shaped picking head comprising resiliently surfaced linearly counter-moving picking means defining the legs of the U, said legs being spaced apart a distance less than the diameter of the fruit to be picked, a fruit conveying surface substantially co-planar therewith defining the base of the U, the region between the legs of the U and the region beyond the termini of those legs remaining substantially unobstructed.

4. The picking head of claim 3 wherein said picking means comprise a pair of endless belts.

5. The picking head of claim 3 wherein motive means for said picking means are located beneath the fruit conveying surface.

6. A picking head for a fruit harvester comprising a flat fruit-conveying surface; a pair of endless belts each rotatably mounted to protrude, substantially parallel to one another and at a distance from one another less than the diameter of the fruit to be picked, from said fruit conveying surface in such fashion that a portion of the surface of each belt is generally co-planar with said fruit conveying surface, the space between said portions being unobstructed; and motive means to counter-rotate said belts.

7. A picking head for a fruit harvester comprising a pair of resilient endless belts, each rotatably mounted at a distance from the other less than the diameter of the fruit to be picked and so that a portion of its surface lies substantially co-planar with and parallel to a portion of the surface of the other said belt, the said portions of said belts defining an unobstructed space between them, and motive means to counter-rotate the said belts.

8. The picking head of claim 7 wherein the region extending beyond a first extremity of the said portions of said belts is unobstructed.

9. The picking head of claim 8 wherein a fruit conveying surface is disposed in the plane defined by the said portions of the said belts and beyond the other extremity thereof.

10. The picking head of claim 9 wherein said motive means are located adjacent said other extremity and below said fruit conveying surface.

11. A picking head for a fruit harvester comprising a pair of resiliently surfaced fruit engaging means each adapted to permit such motion of a portion of its resilient surface that the locus of a point thereon is a line segment parallel to, and spaced at a distance less than the diameter of the fruit to be picked from, the locus of a point on the resilient surface of the other said engaging means; motive means to move both of said fruit engaging means each in a direction opposite to that of the other, said line segments defining an unobstructed space between them.

12. The picking head of claim 11 wherein a fruit conveying surface extends beyond one terminus of said line segments generally disposed in the plane defined by said line segments.

13. The picking head of claim 12 wherein said fruit engaging means are resilient endless belts.

References Cited

UNITED STATES PATENTS

| | | | |
|---|---|---|---|
| 2,698,508 | 1/1955 | Hollister | 56—332 |
| 2,968,141 | 1/1961 | McGough | 56—332 |
| 3,143,844 | 8/1964 | Polk | 56—328 |
| 3,161,007 | 12/1964 | Bergquist | 56—332 |
| 3,195,710 | 7/1965 | Robinson | 198—33 |
| 3,321,062 | 5/1967 | Brockmuller et al. | 198—33 |

RUSSELL R. KINSEY, *Primary Examiner.*